United States Patent
Wei et al.

(10) Patent No.: US 7,779,310 B2
(45) Date of Patent: Aug. 17, 2010

(54) SYSTEM AND METHOD FOR DETECTING A WORK STATUS OF A COMPUTER SYSTEM

(75) Inventors: Cong-Feng Wei, Taipei Hsien (TW);
Po-Chang Wang, Taipei Hsien (TW);
Fu-Chuan Chen, Taipei Hsien (TW);
Wei-Yuan Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 327 days.

(21) Appl. No.: 11/946,849

(22) Filed: Nov. 29, 2007

(65) Prior Publication Data

US 2008/0235546 A1 Sep. 25, 2008

(30) Foreign Application Priority Data

Mar. 21, 2007  (CN)  .................. 2007 1 0200312

(51) Int. Cl.
*G06F 11/00* (2006.01)
(52) U.S. Cl. .............................. 714/55; 714/23; 714/30; 714/47
(58) Field of Classification Search .................. 714/2, 714/10, 23, 25, 30, 47, 48, 55; 710/48, 305, 710/38; 713/2
See application file for complete search history.

(56) References Cited

U.S. PATENT DOCUMENTS

| | | | |
|---|---|---|---|
| 5,884,021 A | 3/1999 | Hirayama et al. | |
| 6,587,966 B1 * | 7/2003 | Chaiken et al. | ............... 714/55 |
| 7,010,724 B1 * | 3/2006 | Hicok | ......................... 714/55 |
| 7,478,299 B2 * | 1/2009 | Brandyberry et al. | ......... 714/47 |
| 2003/0084381 A1 * | 5/2003 | Gulick | ....................... 714/47 |
| 2003/0149912 A1 * | 8/2003 | Lin | ............................. 714/23 |
| 2004/0003317 A1 * | 1/2004 | Kwatra et al. | ................. 714/25 |
| 2004/0139373 A1 * | 7/2004 | Brown | ......................... 714/47 |
| 2005/0055597 A1 * | 3/2005 | Weng et al. | ................. 713/500 |
| 2008/0082711 A1 * | 4/2008 | Wang et al. | ................. 710/260 |

* cited by examiner

*Primary Examiner*—Robert Beausoliel
*Assistant Examiner*—Joseph D Manoskey
(74) *Attorney, Agent, or Firm*—Frank R. Niranjan

(57) ABSTRACT

A system for detecting a work status of a computer system is provided. The system includes a super input/output (Super I/O) chipset, a complex programmable logic device (CPLD), a South Bridge chipset and a device driver. The device driver is configured for driving the Super I/O chipset to generate and send a start signal to the CPLD, and is further configured for driving the Super I/O chipset to periodically generate and send a test signal to the CPLD. The CPLD is configured for receiving the start signal and triggering a clock to start timing from an initial time, monitoring whether a predetermined amount of test signals have been received in a predetermined time, and is further configured for sending a reboot signal to the South Bridge chipset when the predetermined amount of test signals have not been received in the predetermined time. The South Bridge chipset is configured for rebooting the computer system when receiving the reboot signal. A related method is also provided.

5 Claims, 4 Drawing Sheets

SYSTEM AND METHOD FOR DETECTING A WORK STATUS OF A COMPUTER SYSTEM

BACKGROUND OF THE INVENTION

1. Field of the Invention

The present invention relates to monitoring technique of electronic devices, and more particularly to, a system and method for detecting a work status of a computer system.

2. Description of Related Art

Computer systems such as network servers, automated teller machines, have long been plagued by software malfunctions, unauthorized access, and destructive authorized usage, often preventing the computer systems from operating normally. The inability of a computer system to operate normally results in system downtime, lost revenue, and additional maintenance expenses. The duration of the downtime is directly related to the extent of the damage induced. Remote computer systems, for which maintenance and support personnel are not on-site, are the most affected by downtime. Traditionally, a system administrator is required to physically travel to the location of the remote computer system to diagnose the situation and implement a solution to restore normal operation of the computer system. In many cases, the simplest procedure to restore normal operation is to reboot the computer system, returning it to a system start up state. However, if the administrator is not available, it may be hours or even days before the administrator arrives to diagnose a computer system and manually restart the computer system.

Presently, remote monitor and reboot methods are popularly adopted to recover halted computer systems, using the following technique: a computer system regularly transmits recorded data about working status to a remote administrator (a server or a network manager) via a network; the remote administrator determines whether the computer system is in a normal operational status according to the data; and sends a reboot signal to the computer system via the network, if the remote administrator determines that the computer system is in an abnormal operational status. However, the remote monitor and reboot methods rely on expensive chipsets, such as baseboard management controller (BMC). Furthermore, the remote monitor and reboot methods relies on complex data transmission protocols and network security problems, thus a halted computer systems may still be in an abnormal operational status for a long time before being remotely rebooted.

What is needed, therefore, is a system and method for detecting a work status of a computer system, with low circuit design cost and high efficiency.

SUMMARY OF THE INVENTION

A system for detecting a work status of a computer system according to a preferred embodiment is provided. The system includes: a super input/output (Super I/O) chipset, a complex programmable logic device (CPLD), a South Bridge chipset and a device driver. The device driver is configured for driving the Super I/O chipset to generate and send a start signal to the CPLD, and is further configured for driving the Super I/O chipset to periodically generate and send a test signal to the CPLD. The CPLD is configured for receiving the start signal and triggering a clock to start timing from an initial time, monitoring whether a predetermined amount of test signals have been received in a predetermined time, and is further configured for sending a reboot signal to the South Bridge chipset when the predetermined amount of test signals have not been received in the predetermined time. The South Bridge chipset is configured for rebooting the computer system when receiving the reboot signal.

Another embodiment provides a preferred method for detecting a work status of a computer system. The computer system includes a Super I/O chipset, a complex programmable logic device (CPLD), a clock and a South Bridge chipset. The method includes the steps of: (a) driving the Super I/O chipset to generate and send a start signal to the CPLD; (b) receiving the start signal by the CPLD; (c) triggering the clock to start timing from an initial time; (d) driving the Super I/O chipset to periodically generate and send a test signal to the CPLD; (e) monitoring whether the CPLD has received a predetermined amount of test signals within a predetermined time; (f) if the CPLD has not received the predetermined amount of test signals within the predetermined time, determining the computer system is down and sending a reboot signal to the South Bridge chipset; and (g) rebooting the computer system automatically.

Other objects, advantages and novel features of the present invention will be drawn from the following detailed description of the preferred embodiment and preferred method of the present invention with the attached drawings.

DETAILED DESCRIPTION OF THE PREFERRED EMBODIMENT

Figure 1:
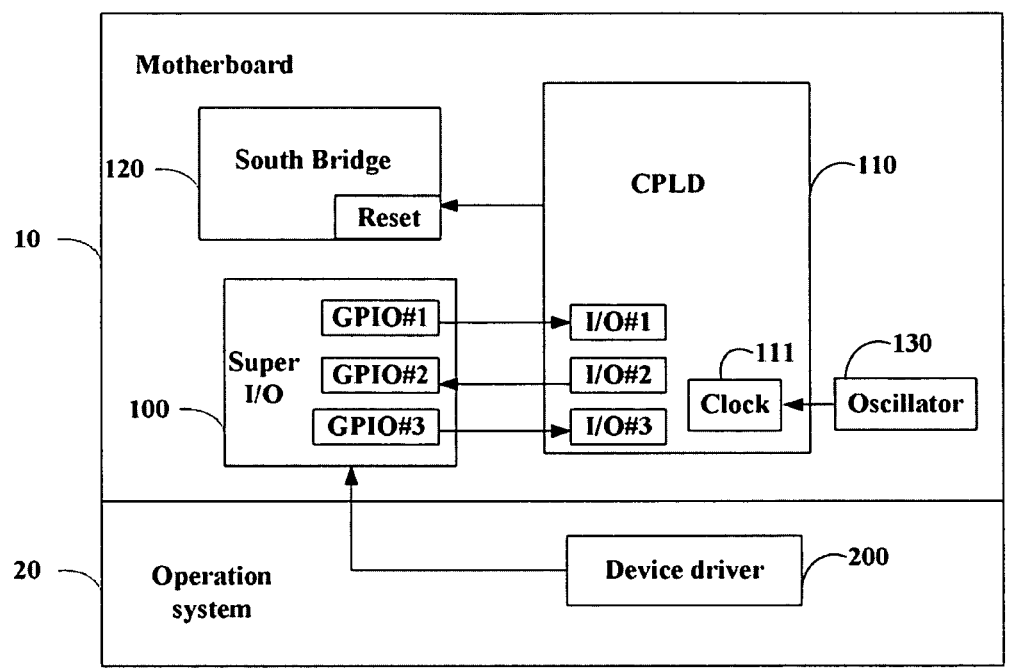
FIG. 1 is a schematic diagram of a system for detecting a work status of a computer system according to a preferred embodiment.

FIG. 1 is a schematic diagram of a system for detecting a work status of a computer system according to a preferred embodiment. The computer system includes a motherboard 10 and an operation system 20. The motherboard 10 includes a super input/output (Super I/O) chipset 100, a complex programmable logic device (CPLD) 110, a South Bridge chipset 120, and an oscillator 130. The operation system 20 includes a device driver 200. The device driver 200 is configured for driving the Super I/O chipset 100 to generate and send signals to the CPLD 110.

The Super I/O chipset 100 connects and communicates with the CPLD 110 via general purpose input/output (GPIO) pins, for example, GPIO #1, GPIO #2 and GPIO #3.

The CPLD 110 connects and communicates with the Super I/O chipset 100 via input/output (I/O) pins, such as I/O #1, I/O #2 and I/O #3, which are connected to the GPIO #1, GPIO #2 and GPIO #3 of the Super I/O chipset 100 respectively.

The South Bridge chipset 120 connects and communicates with the CPLD 110 via a reset pin.

The oscillator 130 provides a work frequency of a clock 111 in the CPLD 110.

The computer system works based on the following principle: first, the device driver 200 drives the Super I/O chipset 100 to generate and send a start signal S to the CPLD 110 via the GPIO #1, then the device driver 200 drives the Super I/O chipset 100 to periodically generate and send a test signal P to the CPLD 110 via the GPIO #3.

When the CPLD 110 receives the start signal S via the I/O #1, the CPLD 110 triggers the clock 111 to start timing from t=0, the CPLD 110 then waits for a predetermined amount of test signals P at the I/O #3 within a predetermined time T, such as T=a duration of m test signals P. If the predetermined amount of test signals P have been received within the predetermined time T, which indicates that the motherboard 10 and the operation system 20 works normally, the CPLD 110 would then send a response signal A to the Super I/O chipset 100 via the I/O #2 and reset the clock 111 to start timing from t=0 again, and waits for the predetermined amount of test signals P again. If the CPLD 110 does not receive the predetermined amount of test signals P within the predetermined time T, the CPLD 110 would send a reboot signal R to the South Bridge chipset 120 so as to reboot the computer system.

Figure 2:
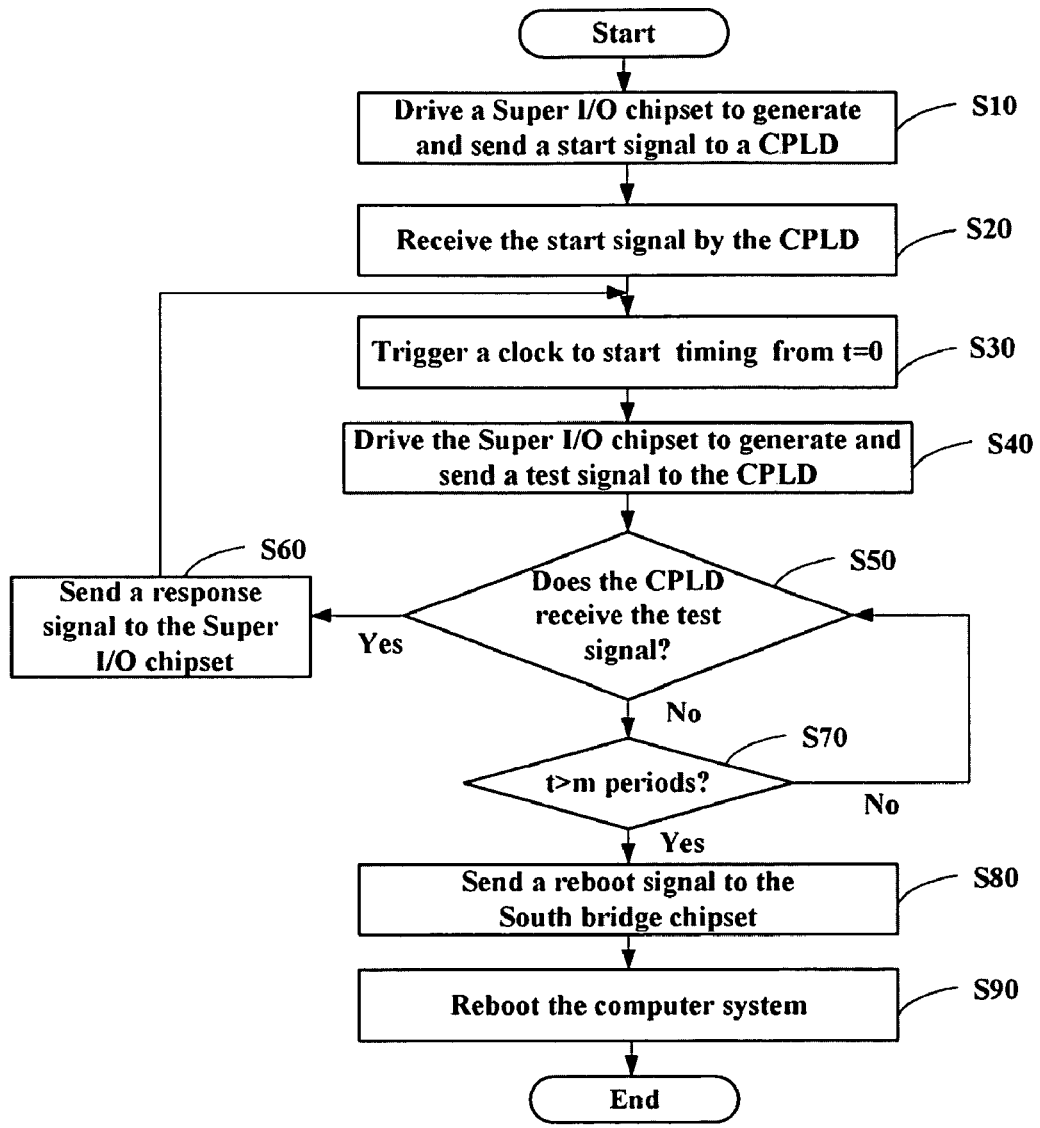
FIG. 2 is a flowchart of a preferred method for detecting a work status of a computer system.

FIG. 2 is a flowchart of a preferred method for detecting a work status of a computer system. Firstly, in step S10, the motherboard 10 is powered on and the operation system 20 boots up, the device driver 200 drives the Super I/O chipset 100 to generate and send a start signal S to the CPLD 110. In step S20, the CPLD 110 receives the start signal S. In step S30, the CPLD 110 triggers the clock 111 to start timing from t=0. In step S40, the device driver 200 drives the Super I/O chipset 100 to periodically generate and send a test signal P to the CPLD 110. In step S50, the CPLD 110 monitors whether a predetermined amount of test signals P have been received at the I/O #3 If the predetermined amount of test signals P have been received, in step S60, the CPLD 110 sends a response signal A to the Super I/O chipset 100, then the procedure goes back to step S30.

If, in step S50, the CPLD 110 monitors that the predetermined amount of test signals P have not been received, in step S70, the CPLD 110 checks whether the time t recorded by the clock 111 exceeds a predetermined time T, such as T=a duration of m test signals P. If the time t does not exceed the predetermined time T, the procedures goes back to step S50.

If, in step S70, the CPLD 110 checks that the time t exceeds the predetermined time T, in step S80, the CPLD 110 sends a reboot signal R to the South Bridge chipset 120. In step S90, the South bridge chipset 120 reboots the computer system.

Figure 3:
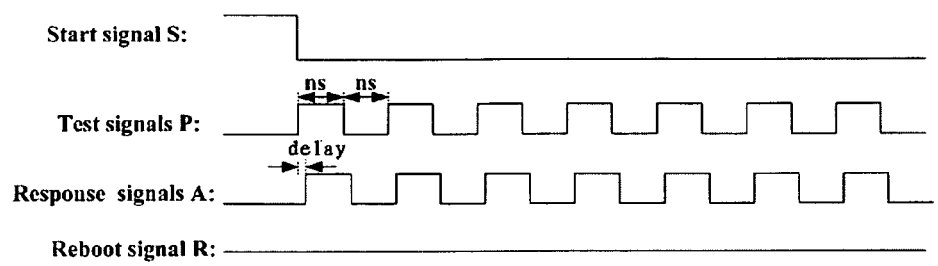
FIG. 3 gives an example of various signals generated in a preferred embodiment when a computer system works normally.

FIG. 3 gives an example of various signals generated in a preferred embodiment when the computer system works normally. When the computer system works normally, the device driver 200 drives the Super I/O chipset 100 to generate and send a start signal S, and a test signal P periodically to the CPLD 110. The CPLD 110 sends a response signal A to the Super I/O chipset 100 once a test signal P has been received in a predetermined time T, such as T=a duration of m test signals P. Therefore, the response signal A is also a periodical signal, and has a delay compared to a corresponding test signal P. The reset pin of the South Bridge chipset 120 maintains a high lever, no reboot signal R is generated.

Figure 4:
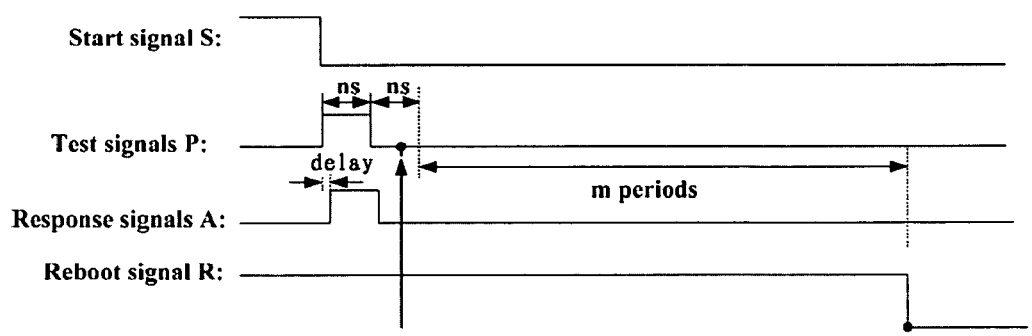
FIG. 4 gives an example of various signals generated in a preferred embodiment when a computer system works abnormally.

FIG. 4 gives an example of various signals generated in a preferred embodiment when the computer system works abnormally. When the computer system works abnormally, the device driver 200 fails to drive the Super I/O chipset 100 to generate and send a test signal P periodically to the CPLD 110. When the CPLD 110 has not received a test signal P in the predetermined time T, such as T=a duration of m test signals P, the CPLD 110 sends a reboot signal R to the South Bridge chipset 120. The reset pin of the South Bridge chipset 120 jumps to a low level from the high level to reboot the computer system.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for detecting a work status of a computer system comprising a Super input/output (I/O) chipset, a complex programmable logic device (CPLD), a South Bridge chipset, and a device driver, wherein:
    the device driver is configured for driving the Super I/O chipset to generate and send a start signal to the CPLD, and driving the Super I/O chipset to periodically generate and send a test signal to the CPLD;
    the CPLD is configured for receiving the start signal and triggering a clock to start timing from an initial time, monitoring whether a predetermined amount of test signals have been received in a predetermined time, sending a reboot signal to the South Bridge chipset when the predetermined amount of test signals have not been received in the predetermined time, and sending a response signal to the Super I/O chipset and resetting the clock to start timing from the initial time when the predetermined amount of test signals have been received in the predetermined time; and
    the South Bridge chipset is configured for rebooting the computer system when the reboot signal is received from the CPLD.

2. The system as claimed in claim 1, wherein the computer system further comprises an oscillator provides a work frequency of the clock in the CPLD.

3. A method for detecting a work status of a computer system, the computer system comprising a Super input/output (I/O) chipset, a complex programmable logic device (CPLD), a clock and a South Bridge chipset, the method comprising:
    driving the Super I/O chipset to generate and send a start signal to the CPLD;
    receiving the start signal by the CPLD;
    triggering a clock to start timing from an initial time;
    driving the Super I/O chipset to periodically generate and send a test signal to the CPLD;
    monitoring whether the CPLD has received a predetermined amount of test signals within a predetermined time;
    determining that the computer system works normally and sending a response signal to the Super I/O chipset, if the CPLD has received the predetermined amount of test signals within the predetermined time;
    determining that the computer system works abnormally and sending a reboot signal to the South Bridge chipset, if the CPLD has not received the predetermined amount of test signals within the predetermined time; and
    rebooting the computer system automatically when the reboot signal is received from the CPLD.

4. The method as claimed in claim 3, further comprising:
    resetting the clock to start timing from the initial time and waiting for the predetermined amount of test signals when the predetermined amount of test signals have been received by the CPLD within the predetermined time.

5. The method as claimed in claim 3, wherein the computer system further comprises an oscillator provides a work frequency of the clock in the CPLD.

* * * * *